US010114358B2

(12) United States Patent
Fujiwara et al.

(10) Patent No.: US 10,114,358 B2
(45) Date of Patent: Oct. 30, 2018

(54) INFORMATION PROCESSING DEVICE, INFORMATION PROCESSING DEVICE CONTROL METHOD AND CONTROL PROGRAM

(71) Applicant: OMRON Corporation, Kyoto-shi, Kyoto (JP)

(72) Inventors: Shohei Fujiwara, Otsu (JP); Hiromu Suganuma, Otsu (JP); Nobuyuki Takuma, Kusatsu (JP); Takehiko Hioka, Ritto (JP); Yasuki Yoda, Ritto (JP); Toshiyuki Nakamura, Ritto (JP)

(73) Assignee: OMRON Corporation, Kyoto-shi (JP)

( * ) Notice: Subject to any disclaimer, the term of this patent is extended or adjusted under 35 U.S.C. 154(b) by 270 days.

(21) Appl. No.: 14/892,751

(22) PCT Filed: Jun. 12, 2014

(86) PCT No.: PCT/JP2014/065626
§ 371 (c)(1),
(2) Date: Nov. 20, 2015

(87) PCT Pub. No.: WO2014/200070
PCT Pub. Date: Dec. 18, 2014

(65) Prior Publication Data
US 2016/0091883 A1 Mar. 31, 2016

(30) Foreign Application Priority Data

Jun. 13, 2013 (JP) ................................. 2013-124413

(51) Int. Cl.
*G05B 19/05* (2006.01)
*G05B 23/02* (2006.01)

(52) U.S. Cl.
CPC ........ *G05B 19/058* (2013.01); *G05B 23/0264* (2013.01); *G05B 2219/1215* (2013.01); *G05B 2219/14055* (2013.01)

(58) Field of Classification Search
CPC .......... G05B 19/058; G05B 2219/1215; G05B 2219/14055; G05B 23/0264
(Continued)

(56) References Cited

U.S. PATENT DOCUMENTS

| 4,908,746 A * | 3/1990 | Vaughn ................ G05B 19/058 700/18 |
| 2005/0063114 A1* | 3/2005 | Suhara ..................... G05B 9/03 361/62 |

(Continued)

FOREIGN PATENT DOCUMENTS

| EP | 1396771 A1 | 3/2004 |
| EP | 1857899 A2 | 11/2007 |

(Continued)

OTHER PUBLICATIONS

Extended European search report dated Aug. 9, 2017 in the counterpart European patent application.

(Continued)

*Primary Examiner* — Walter H Swanson
(74) *Attorney, Agent, or Firm* — Metrolexis Law Group, PLLC

(57) ABSTRACT

An information processing device collects information on an operating state of a communication system formed of a master device that manages communication over a network and at least one slave device connected to the network and capable of performing communication as instructed by the master device. The master device and the slave device record communication log entries regarding time information and a communication state in accordance with communication processing. The information processing device includes an acquiring section that acquires communication log entries from at least one of the master device and the slave device, a log entry rearranging section that rearranges the acquired communication log entries based on the time information, and a log entry extracting section that extracts, out of the rearranged communication log entries, any communication log entry recorded within a predetermined (Continued)

period of time from occurrence of a communication log entry including communication abnormality information.

9 Claims, 9 Drawing Sheets

(58) Field of Classification Search
USPC .............................................................. 700/3
See application file for complete search history.

(56) References Cited

U.S. PATENT DOCUMENTS

| 2005/0198034 A1* | 9/2005 | Boyer ................ G05B 19/4183 |
| 2007/0073426 A1* | 3/2007 | Chand ................ G05B 19/0426 |
| | | 700/87 |
| 2007/0168068 A1* | 7/2007 | Saito .................... G05B 19/042 |
| | | 700/109 |
| 2008/0313228 A1* | 12/2008 | Clark ................... G05B 19/058 |
| 2012/0005743 A1 | 1/2012 | Kitazawa et al. |
| 2012/0290107 A1 | 11/2012 | Carlson et al. |

FOREIGN PATENT DOCUMENTS

| JP | 2012-208931 A | 10/2012 |
| WO | 2006/045480 A1 | 5/2006 |

OTHER PUBLICATIONS

The leaflet issued in Aug. 2014 which desicribes the software (CX-Programmer Ver. 9) disclosed on p. 1 of the specification.

\* cited by examiner

FIG.10

| Display of troubleshooting log |
|---|

| T10: Transmission succeeded (D → A) |
|---|
| T11: Receiving succeeded (A ← D) |
| T12: Transmission succeeded (A → B) |
| T13: Receiving succeeded (B ← A) |
| T14: Transmission succeeded (B → C) |
| T15: Receiving succeeded (C ← B) |
| T16: Transmission failed (C → E) |
| T17: Timeout (C ← E) |
| T18: Timeout (B ← C) |
| T19: Timeout (A ← B) |
| T20: Timeout (D ← E) |

| Communication timeout has occurred during communication with safety slave. |
|---|
| Causes |
| (1) Abnormality in setting: the task execution timeout time with respect to the master PLC is set to an excessively small value. |
| (2) Excessive noise has occurred. |
| (3) A system abnormality has occurred in the master PLC. |
| (4) Occurrence of abnormality in safety slave PLC: Some abnormality has occurred in this device, and process data communication has not been properly executed. As a result, a communication timeout is detected. |

INFORMATION PROCESSING DEVICE, INFORMATION PROCESSING DEVICE CONTROL METHOD AND CONTROL PROGRAM

TECHNICAL FIELD

The present invention relates to an information processing device that collects information on the operating state of a communication system formed of a master device that manages communication over a network and at least one slave device that is capable of performing communication as instructed by the master device, a method for controlling the information processing device, and a control program.

RELATED ART

A PLC (Programmable Logic Controller) that is used as a control device for industrial equipment and the like is constituted by a plurality of units including a CPU unit that performs overall control of the PLC, a communication unit that performs communication, an I/O unit that performs input/output of signals, and the like. In order for such a PLC to perform the control as desired by a user, the user designs the details of control of the PLC, that is to say, the user designs a user program, for example. At this time, generally, the user installs predetermined software on a personal computer (computer) and uses the installed software.

"Omron Corporation, CX-Programmer support software Ver. 9.0, Japanese-language version (first sold in 2009)" (Non-Patent Document 1), for example, discloses a development support device that supports the development of such a PLC.

When maintenance work is to be performed on a PLC with respect to which design and the like of the details of control is performed using such a development support device, a personal computer (computer), for example, is connected to the PLC. Support software for performing maintenance work on the PLC is installed on the personal computer in advance.

Specifically, the support software contains the method for handling the PLC and guide information (contents) for troubleshooting.

For a PLC, codes (event codes) that unambiguously indicate the state of the PLC or the operation of the PLC are predetermined. In this regard, JP 2012-208931A discloses a technology that collects information on the operating state of a PLC and displays the information on a display.

RELATED ART DOCUMENTS

Patent Documents

Patent Document 1: JP 2012-208931A

Non-Patent Documents

Non-Patent Document 1: "Omron Corporation, CX-Programmer support software Ver. 9.0, Japanese-language version (first sold in 2009)"

SUMMARY OF THE INVENTION

Problem to be Solved by the Invention

However, according to conventional configurations, with respect to a system that uses a plurality of PLCs, information on an abnormal (error) condition stored in the individual PLCs is collected, and the error condition is merely displayed. Thus, even when mutually related error conditions occur as in the case of a communication abnormality, the situation cannot be easily recognized. Accordingly, there is a problem in that it is difficult to easily locate a fault to be eliminated.

The present invention was made to address problems such as that described above, and it is an object thereof to provide an information processing device that collects information on the operating state of a communication system formed of a master device that manages communication over a network and at least one slave device that is capable of performing communication as instructed by the master device, the information processing device being capable of easily recognizing mutually related error conditions, a method for controlling the information processing device, and a control program.

Means for Solving the Problems

An information processing device according to an aspect of the present invention is an information processing device that collects information on an operating state of a communication system formed of a master device that manages communication over a network and at least one slave device that is connected to the network and that is capable of performing communication as instructed by the master device, wherein the master device and the slave device record communication log entries regarding time information and a communication state in accordance with communication processing, the information processing device including an acquiring section that acquires communication log entries from at least one of the master device and the slave device, a log entry rearranging section that rearranges the acquired communication log entries based on the time information, and a log entry extracting section that extracts, out of the communication log entries rearranged by the log entry rearranging section, any communication log entry recorded within a predetermined period of time from occurrence of a communication log entry including communication abnormality information that indicates occurrence of an abnormality in communication as the communication state.

Preferably, the information processing device may further include a display section that displays the extracted communication log entries.

Preferably, the communication system may be provided with a safety slave device that is connected to a device related to safety and a safety master device for managing the safety slave device, the safety slave device or the safety master device may be connected to at least one of the master device and the slave device, and the safety master device may be configured to issue an instruction to the safety slave device via the master device. The safety master device and the safety slave device may record communication log entries regarding the time information and the communication state in accordance with the communication processing. The acquiring section may further acquire communication log entries from at least one of the safety master device and the safety slave device.

Preferably, the information processing device may further include an abnormality cause analysis database that stores a cause of an abnormality and an abnormality pattern associated therewith, the abnormality pattern including at least one communication log entry including communication abnormality information, and an abnormality cause identifying section that identifies a cause of the abnormality with respect to the extracted communication log entries by referring to the abnormality cause analysis database.

A method for controlling an information processing device according to another aspect of the present invention is a method for controlling an information processing device that collects information on an operating state of a communication system formed of a master device that manages communication over a network and at least one slave device that is connected to the network and that is capable of performing communication as instructed by the master device, wherein communication log entries regarding time information and a communication state are recorded in the master device and the slave device in accordance with communication processing, the method including the steps of acquiring communication log entries from at least one of the master device and the slave device, rearranging the acquired communication log entries based on the time information, and extracting, out of the rearranged communication log entries, any communication log entry recorded within a predetermined period of time from occurrence of a communication log entry including communication abnormality information that indicates occurrence of an abnormality in communication as the communication state.

A control program of an information processing device according to another aspect of the present invention is a control program of an information processing device that collects information on an operating state of a communication system formed of a master device that manages communication over a network and at least one slave device that is connected to the network and that is capable of performing communication as instructed by the master device, the control program being executable on a computer of the information processing device, wherein communication log entries regarding time information and a communication state are recorded in the master device and the slave device in accordance with communication processing, the program causing the computer to execute processing including the steps of acquiring communication log entries from at least one of the master device and the slave device, rearranging the acquired communication log entries based on the time information, and extracting, out of the rearranged communication log entries, any communication log entry recorded within a predetermined period of time from occurrence of a communication log entry including communication abnormality information that indicates occurrence of an abnormality in communication as the communication state.

Effects of the Invention

It is possible to easily identify mutually related error conditions.

BRIEF DESCRIPTION OF THE DRAWINGS

FIG. 10 is a diagram illustrating display of a troubleshooting log that is displayed on a display section 13 according to Embodiment 2.

EMBODIMENTS OF THE INVENTION

Figure 1:
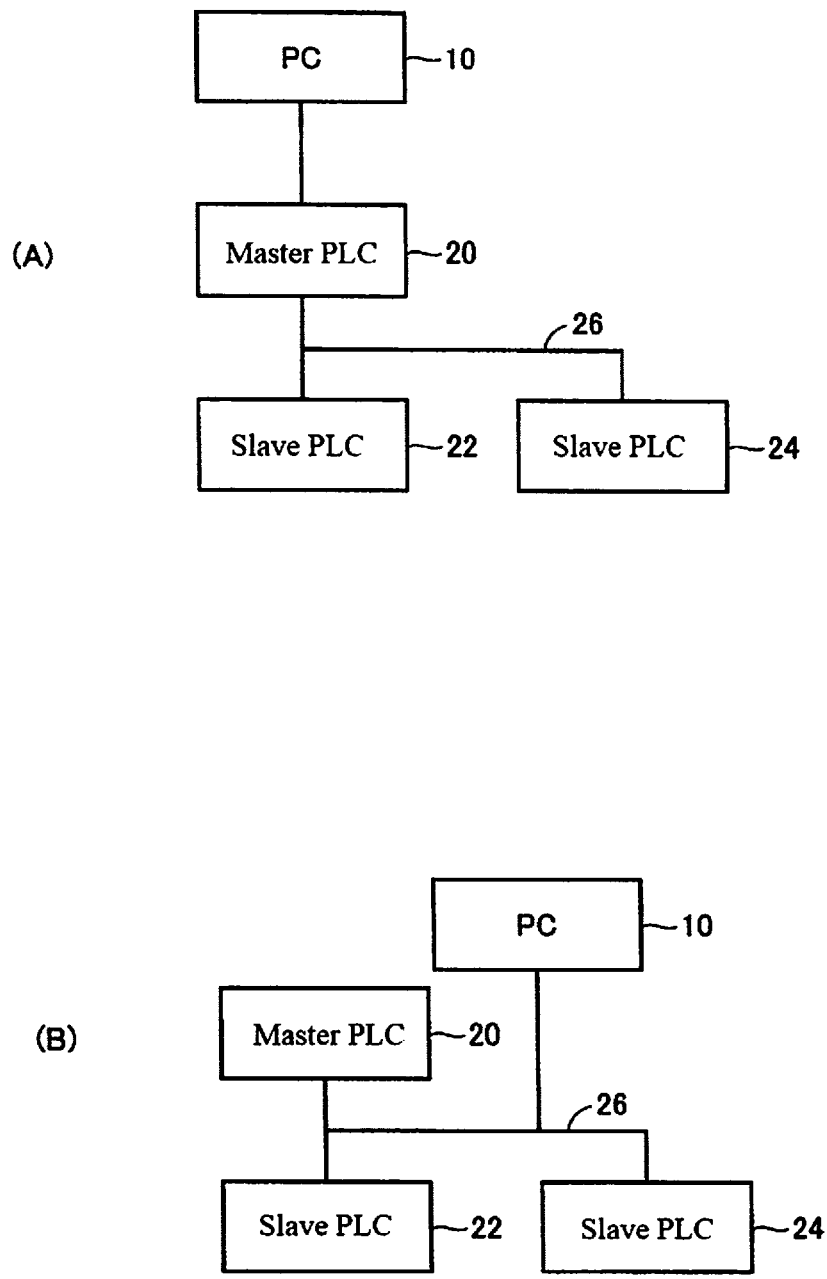
FIG. 1 shows diagrams illustrating configurations of a communication system according to Embodiment 1 of the present invention.

Hereinafter, embodiments of the present invention will be described in detail with reference to the drawings. The following description denotes like or corresponding portions in the drawings by like reference numerals, and does not repeat the descriptions thereof.

Embodiment 1

FIG. 1 shows diagrams illustrating configurations of a communication system according to Embodiment 1 of the present invention.

Referring to FIG. 1(A), a communication system according to Embodiment 1 includes a PC (personal computer) 10, which is an information processing device, a master PLC 20, a slave PLC 22, a slave PLC 24, and a network 26 to which the PLCs are connected.

In the present example, a configuration in which three PLCs are connected to the network 26 is described as an example. However, the number of PLCs is not limited to this, and a configuration is also possible in which a plurality of further PLCs are connected.

Predetermined software for causing the PC 10 to perform maintenance work on the PLCs as a development support device is installed on the PC 10, and processing for maintenance of the PLCs based on that software is executed. In the present example, the PC 10 is connected to the master PLC 20 and acquires information on the state of the master PLC 20 as well as the slave PLCs 22 and 24 and the like via the master PLC 20. Then, various types of processing for performing the maintenance work on the PLCs are executed based on the acquisition result. For example, display or the like of guide information for troubleshooting is performed. In the present example, a case in which information on the state of the PLCs is acquired via the master PLC 20 as shown in FIG. 1(A) is described. However, the present invention is not particularly limited to this configuration. A configuration may also be adopted in which the PC 10 is connected to the network 26 and acquires information on the state of the PLCs as shown in FIG. 1(B).

Generally, PLCs of a standard type (standard PLCs) that control ordinary objects to be controlled and PLCs of a safety type (safety PLCs) that are used for safety are known as PLCs that are used to, for example, control production equipment in factories.

A standard PLC is configured by combining a plurality of units such as a CPU unit that executes calculations based on a control program, an input unit to which input devices are connected and which captures ON and OFF signals of the input devices as input signals, an output unit to which output devices are connected and which transmits output signals to the output devices, a communication unit that transmits/receives data to/from other devices connected to the network, and a power unit that supplies power to the various units. These units are electrically connected to one another by an internal bus, and data is exchanged between predetermined units via the internal bus.

For example, the CPU unit receives input of an ON signal or an OFF signal of an input device as IN data, performs a logical calculation of the input ON/OFF information using the user program, outputs the calculation result to an output device as OUT data. This output serves as an operation instruction to the output device and causes the output device to operate. The above-described process is repeated cyclically, and thus a production facility is controlled.

Standard PLCs connected to a network constitute a communication system and transmit/receive data via the corresponding communication units. In this regard, at least one of the plurality of PLCs serves as a master PLC and manages the communication over the network, while the other PLCs (also referred to as "slave PLCs" in the present example) perform data communication with each other as instructed by the master PLC.

A safety PLC incorporates a self-diagnostic function in terms of safety and thus ensures a high degree of reliability with respect to the control thereof. The safety PLC includes such a function (fail-safe function) that if an abnormality is detected as a result of self-diagnosis of the safety PLC, the safety PLC forcibly performs safe control so as to prevent the control of the safety PLC itself from leading to danger.

The safety PLC includes a communication master function of performing network communication with a safety I/O terminal and sometimes may be referred to as "safety master". Moreover, the safety I/O terminal may also be referred to as "safety slave".

The safety slave includes a function of performing network communication with the communication master function of the safety PLC, that is to say, a communication slave function that is controlled in accordance with the master. The safety slave includes a connecting terminal, and at least one of a safety input device, such as a switch, that issues an ON/OFF signal and a safety output device that constitutes an output destination of a control signal is connected to the connecting terminal.

Examples of the safety input device include an emergency stop switch SW, a light curtain, a door switch, a two-hand switch, and the like. Examples of the safety output device include a safety relay and a contactor. These safety input devices or safety output devices also conform to the standards for safety. The safety slave generates control data based on a signal that is input from a safety device connected to the safety slave, and transmits the generated control data to the safety PLC by network communication.

The safety PLC and the safety slave also have basically the same types of functions as those of the standard PLC.

The safety PLC receives input of an input signal of a safety input device that is input to from a safety slave via a communication unit by network communication, and performs a logical calculation with respect to ON/OFF of the input signal using a logic program that is stored in advance. The safety PLC outputs an output signal based on the calculation result to a safety slave via the communication unit by network communication. The safety slave outputs the output signal to a safety output device. Such a series of operations is executed repeatedly, and thus the safety PLC can control the entire system including a manufacturing robot. Moreover, a safety output device, such as a safety relay or a contactor, connected to the safety slave is connected to a manufacturing robot, a processing machine, a cutting machine, or the like. The manufacturing robot or the like is operated when a contact of the relay or the contactor is turned on, and the manufacturing robot or the like is stopped when the contact is turned off. Thus, the safety PLC executes control regarding stopping of the operation of an operating robot or the like, which is an object to be ultimately controlled, by performing ON-OFF control of a safety output device.

Figure 2:
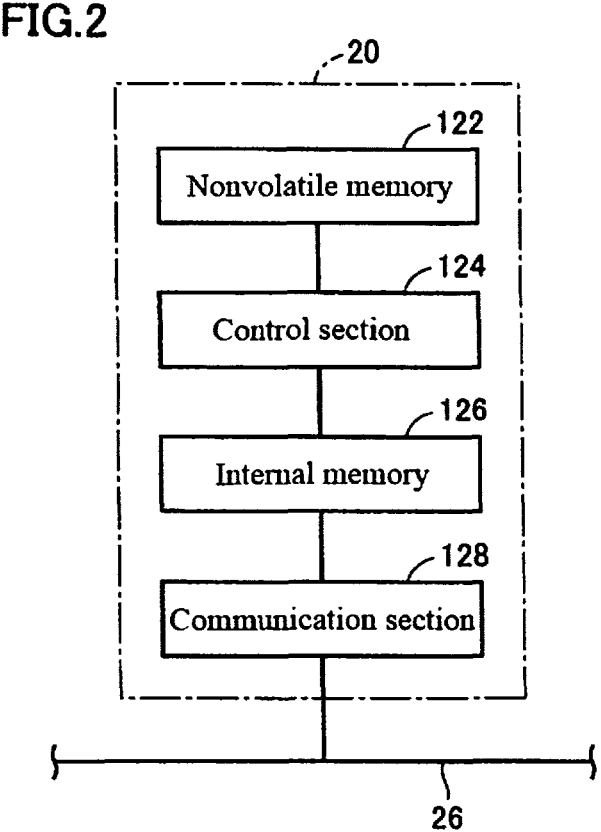
FIG. 2 is a block diagram that schematically shows a functional configuration of a master PLC 20.

FIG. 2 is a block diagram that schematically shows a functional configuration of the master PLC 20.

Referring to FIG. 2, the master PLC 20 includes a control section 124, a nonvolatile memory 122, an internal memory 126, and a communication section 128. These functions are realized by combining a plurality of units, for example, a CPU unit, a communication unit, and the like.

The control section 124 is constituted mainly by a microprocessor or the like, and centrally manages the entire PLC.

A transmission data designation table, for example, is stored in the nonvolatile memory 122. The contents of this transmission data designation table may be changed by the development support device (PC 10) executing a predetermined tool function. The transmission data designation table contains, for example, information on PLCs and the like that constitute transmission destinations of transmission data, the information being associated with the transmission data. Data communication or the like between PLCs is executed in accordance with this table.

The internal memory 126 relays communication between the control section 124 and the communication section 128. A transmission or receiving buffer is stored in the internal memory 126. Moreover, the internal memory 126 is also used as a working memory.

The communication section 128 is constituted by a transmitter-receiver circuit. The communication section 128 transmits transmission data stored in the transmission buffer in the internal memory 126 to another PLC, and receives transmission data from other PLCs (slave PLC 22, slave PLC 24, and the like) and stores the data in the receiving buffer in the internal memory 126. The reception data that is thus stored in the receiving buffer in the internal memory 126 is read out by the control section 124 at an appropriate timing and used for execution of a user program. Also, the transmission data stored in the transmission buffer in the internal memory 126 is read out by the communication section 128 at an appropriate timing and transmitted to the slave PLC 22 or the slave PLC 24 over the network 26.

Note that although the functional configuration of the master PLC is described schematically here, the slave PLC as well as the safety master and the safety slave, which will be described later, also have basically the same functional configuration as that described above, and are configured to be capable of data communication with various devices.

In the present example, it is assumed that the master PLC and the slave PLCs each record communication log entries during data communication (communication processing) and store the communication log entries in the nonvolatile memory 122. The communication log entries include time information of the communication processing, information regarding the communication state (e.g., communication has been performed successfully, or an abnormality has occurred), and the like.

Figure 3:
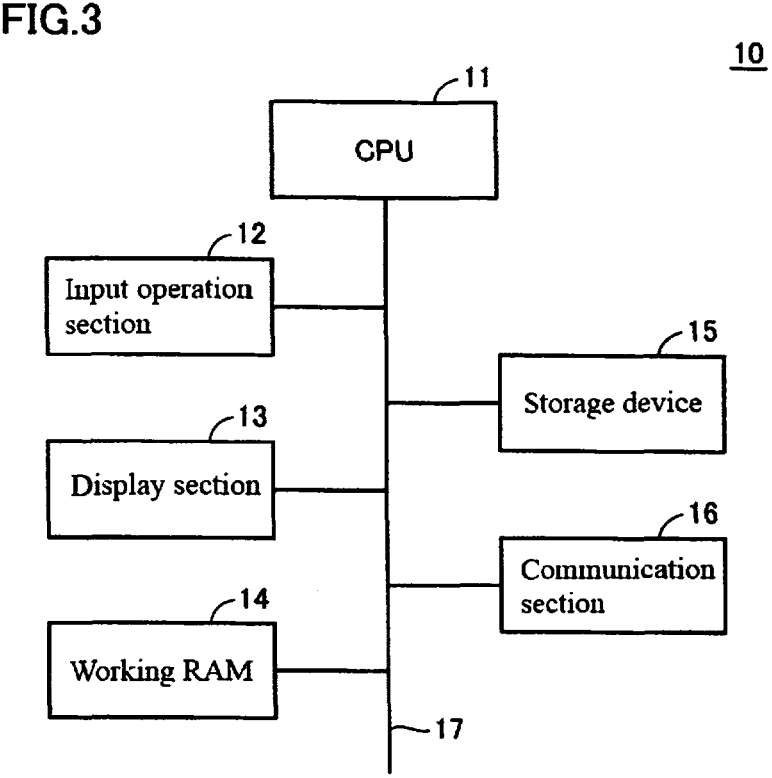
FIG. 3 is a block diagram that schematically shows a hardware configuration of a PC 10 according to Embodiment 1.

FIG. 3 is a block diagram that schematically shows a hardware configuration of the PC 10 according to Embodiment 1.

Referring to FIG. 3, the block diagram shown represents a typical configuration example.

The PC 10 includes at least a CPU 11 that centrally controls the entire device, an input operation section 12 for input operation including mouse operation, keyboard operation, and the like, a display section 13 that performs display processing, a working RAM 14 that is used for operation input processing, predetermined calculation processing, image processing with respect to a display screen, and the like, a communication section 16 that manages an interface for external communication, and a storage device 15. The storage device 15 stores the support program for performing maintenance work on the PLCs of the communication system of the information processing device 10, and various types of processing of the present application are executed by reading this program.

The above-described various sections are configured in such a manner as to be connected to an internal bus 17.

Note that as described above, the PC 10 may be a development support device that is used in designing a PLC constituting the system. Specifically, the PC 10 may be configured by incorporating predetermined tool software into a personal computer. The PLC that has been designed using the development support device is downloaded to each PLC, and thus various functions can be realized. In addition, it is also possible to execute the processing of the present example by providing a function for diagnosing whether an abnormality occurs in the communication system as part of the functions of the development support device.

Figure 4:
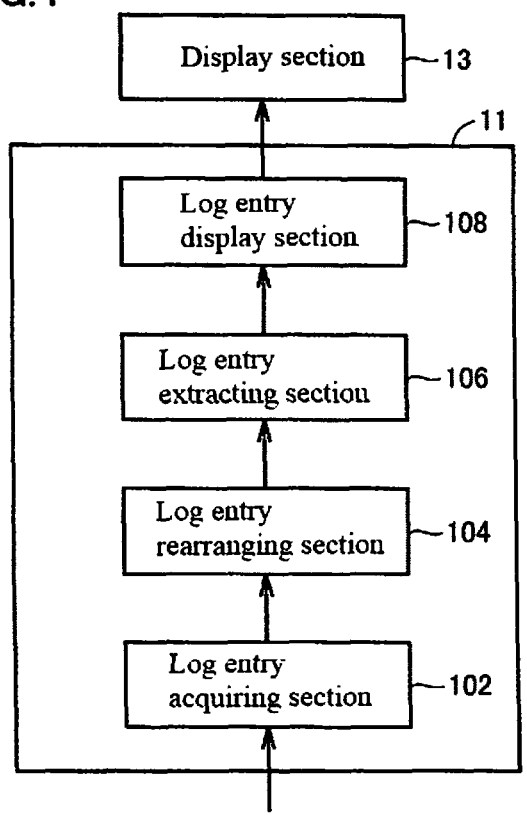
FIG. 4 is a diagram illustrating functional blocks that are executed by a CPU 11 of the PC 10 according to Embodiment 1.

FIG. 4 is a diagram illustrating functional blocks that are executed by the CPU 11 of the PC 10 according to Embodiment 1.

Referring to FIG. 4, in the present example, the PC 10 includes a log entry acquiring section 102 that acquires communication log entries from the PLCs as history information regarding the communication state, a log entry rearranging section 104 that rearranges the acquired communication log entries, a log entry extracting section 106 that extracts log entries from the rearranged communication log entries as necessary, and a log entry display section 108 that displays the extracted log entries.

Figure 5:
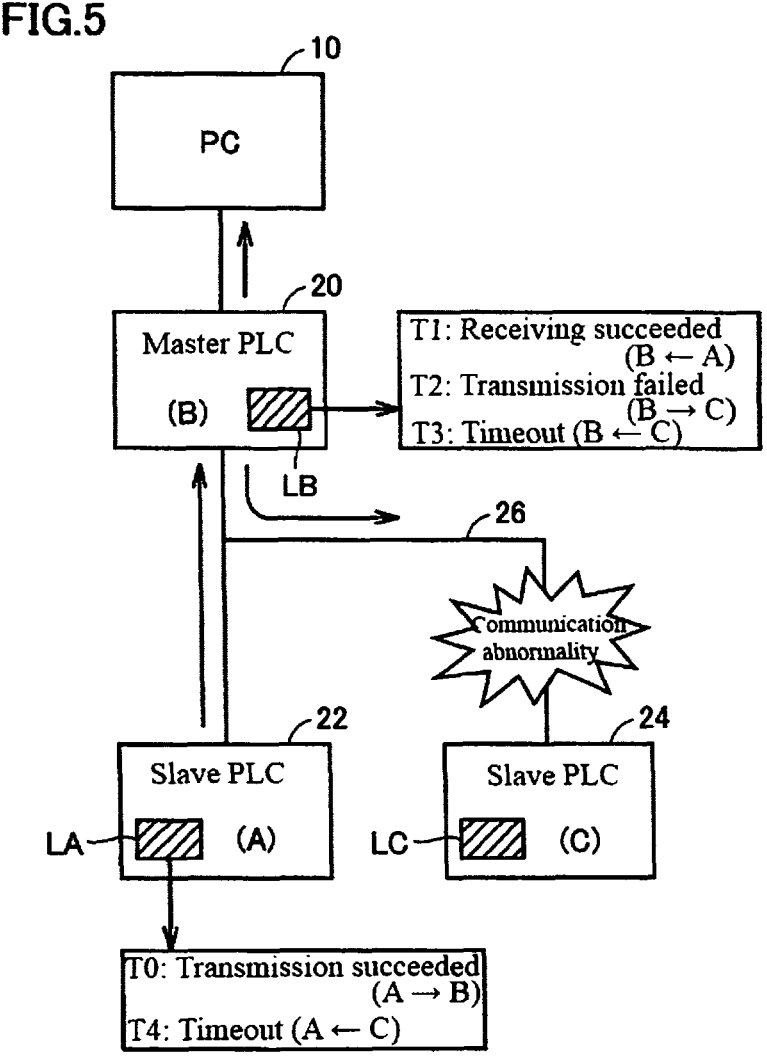
FIG. 5 is a diagram illustrating a case in which a communication abnormality occurs in the communication system according to Embodiment 1.

FIG. 5 is a diagram illustrating a case in which a communication abnormality has occurred in the communication system according to Embodiment 1.

Referring to FIG. 5, in the communication system, a case in which data is transmitted from the slave PLC 22 to the slave PLC 24 via the master PLC 20 is described in the present example.

Moreover, in the present example, it is assumed that a communication abnormality has occurred during data communication from the master PLC 20 to the slave PLC 24.

The PLCs record communication log entries during the data communication. In the present example, it is assumed that the master PLC 20, for example, retains a communication log (log file) LB in which communication log entries are recorded. It is assumed that the slave PLC 22 retains a communication log LA. Also, it is assumed that the slave PLC 24 retains a communication log LC.

The PC 10 requests the PLCs to transmit the recorded communication log entries. Then, in response to the transmission request, the PLCs transmit the communication log entries saved in the respective PLCs to the PC 10.

In the present example, a case in which data communication is performed with the slave PLC 22, which is referred to as a device "A", the master PLC 20, which is referred to as a device "B", and the slave PLC 24, which is referred to as a device "C", will be described.

The communication log LA records that data has been successfully transmitted from the device A to the device B at time T0 "Transmission succeeded (A→B)" and that a timeout has occurred at time T4 due to the absence of data communication from the device C to the device A "Timeout (A←C)".

The communication log LB records that the device B has successfully received data from the device A at time T1 "Receiving succeeded (B←A)", that data has not been successfully transmitted from the device B to the device C at time T2 "Transmission failed (B→C)", and that a timeout has occurred at time T3 due to the absence of data communication from the device C to the device B "Timeout (B←C)".

Figure 6:
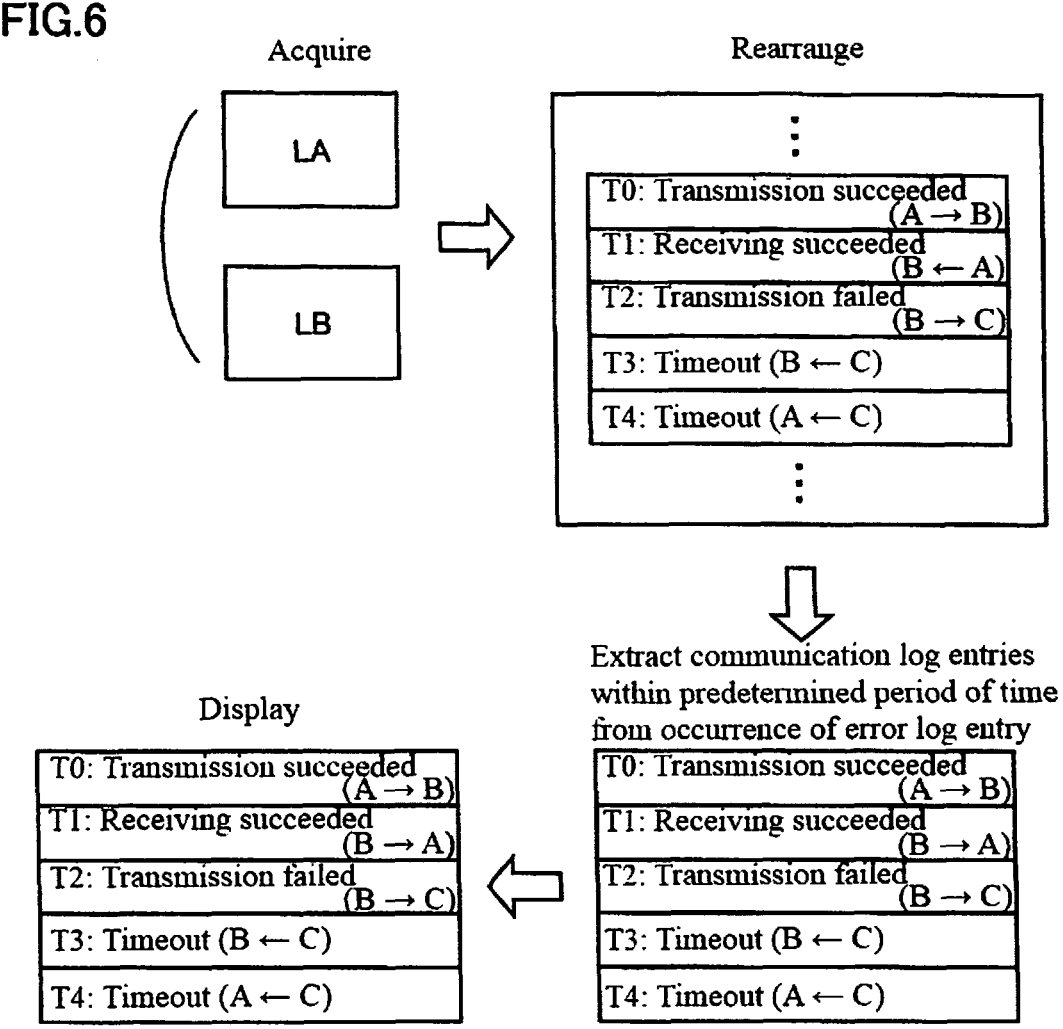
FIG. 6 is a diagram illustrating an example of communication log entries that are processed by the PC 10 of the communication system according to Embodiment 1.

FIG. 6 is a diagram illustrating an example of communication log entries that are processed by the PC 10 of the communication system according to Embodiment 1.

Referring to FIG. 6, the log entry acquiring section 102 of the PC 10 acquires communication log entries from the PLCs. Specifically, in the present example, the log entry acquiring section 102 acquires the communication logs LA and LB of the master PLC 20 and the slave PLC. Note that in the present example, it is assumed that the log entry acquiring section 102 does not acquire the communication log LC from the slave PLC 24 because the communication abnormality has occurred.

The log entry rearranging section 104 of the PC 10 rearranges the communication log entries contained in the communication logs LA and LB in chronological order in accordance with the times (time information) contained in the respective communication log entries.

In the present example, a case in which the communication log entries are rearranged in chronological order from time T0 up to time T4 is shown.

Then, the log entry extracting section 106 extracts, out of the communication log entries rearranged by the log entry rearranging section 104, communication log entries that have been recorded within a predetermined period of time from the occurrence of a communication log entry including communication abnormality information that indicates the occurrence of the abnormality in communication as the communication state. Specifically, in the present example, it is assumed that "Transmission failed" or "Timeout" corresponds to a communication log entry that indicates communication abnormality information.

For example, communication log entries that have been recorded within a predetermined period of time (predetermined range) before and after the communication log entry (also referred to as "error log entry") including the communication abnormality information are extracted as the communication log entries that have been recorded within a predetermined period of time from the occurrence of the communication log entry including the communication abnormality information.

The above-described processing makes it possible to collectively display a series of communication log entries including communication log entries (error log entries) and the like including communication abnormality information by extracting those communication log entries that have been recorded within a predetermined period of time before and after the communication log entry (error log entry) including the communication abnormality information, instead of extracting and displaying only the communication log entries that include communication abnormality information or displaying all the communication log entries. Therefore, mutually related error conditions can be easily recognized.

Note that although a method for extracting communication log entries that have been recorded within a predetermined period of time relative to an error log entry was described in the present example, a person skilled in the art can appropriately change the predetermined period of time. Moreover, although a case in which communication log entries that have been recorded within a predetermined period of time before and after a communication log entry are extracted was described in the present example, it is also possible to extract communication log entries that have been recorded after the occurrence of an error log entry.

Modification

Figure 7:
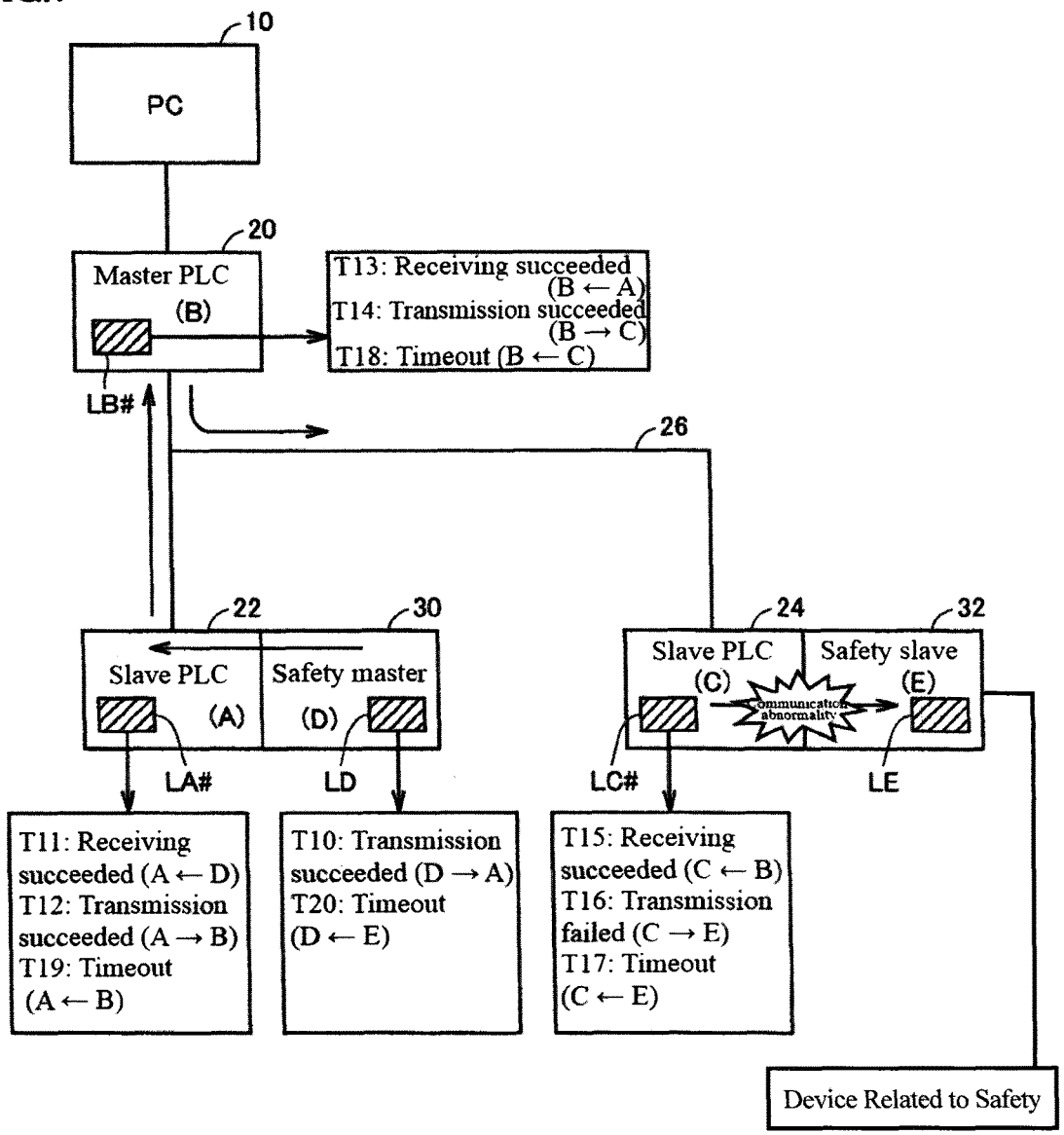
FIG. 7 is a diagram illustrating a case in which a communication abnormality occurs in a communication system according to a modification of Embodiment 1.

FIG. 7 is a diagram illustrating a case in which a communication abnormality has occurred in a communication system according to a modification of Embodiment 1.

Referring to FIG. 7, the communication system according to the modification of Embodiment 1 further includes a safety master and a safety slave. Specifically, a case in which the safety master and the safety slave are combined with the master PLC and the slave PLCs and thus constitute the communication system is shown. In the present example, the safety master and the safety slave each operate in cooperation with the master PLC or one of the slave PLCs. As an example, a case in which a safety master 30 is coupled to the slave PLC 22 and a safety slave 32 is coupled to the slave PLC 24 is shown. Due to this coupling, the safety master 30 is connected to the network 26 via the internal bus of the slave PLC 22 and thus performs data communication. Also, the safety slave 32 is connected to the network 26 via the internal bus of the slave PLC 24 and thus performs data communication.

In the present example, a case in which data is transmitted from the safety master 30 to the safety slave 32 is described. In addition, in the present example, it is assumed that a communication abnormality has occurred during data communication from the slave PLC 24 to the safety slave 32.

The PLCs record communication log entries during the data communication. In the present example, it is assumed that, for example, the master PLC 20 retains a communication log LB# in which communication log entries are recorded. It is assumed that the slave PLC 22 retains a communication log LA#. It is assumed that the slave PLC 24 retains a communication log LC#. It is assumed that the safety master 30 retains a communication log LD. Moreover, it is assumed that the safety slave 32 retains a communication log LE.

The PC 10 requests the PLCs to transmit the recorded communication log entries. Then, in response to the transmission request, the PLCs transmit the communication log entries saved in the respective PLCs to the PC 10.

In the present example, a case in which data communication is performed with the slave PLC 22, which is referred to as the device "A", the master PLC 20, which is referred to as the device "B", the slave PLC 24, which is referred to as the device "C", the safety master 30, which is referred to as a device "D", and the safety slave 32, which is referred to as a device "E", will be described.

The communication log LD records that data has been successfully transmitted from the device D to the device A at time T10 "Transmission succeeded (D→A)", and that a timeout has occurred at time T20 due to the absence of data communication from the device E to the device D "Timeout (D←E)".

The communication log LA# records that the device A has successfully received data from the device D at time T11 "Receiving succeeded (A←D)", that data has been successfully transmitted from the device A to the device B at time T12 "Transmission succeeded (A→B)", and that a timeout has occurred at time T19 due to the absence of data communication from the device B to the device A "Timeout (A←B)".

The communication log LB# records that the device B has successfully received data from the device A at time T13 "Receiving succeeded (B←A)", that data has been successfully transmitted from the device B to the device C at time T14 "Transmission succeeded (B→C)", and that a timeout has occurred at time T18 due to the absence of data communication from the device C to the device B "Timeout (B←C)".

The communication log LC# records that the device C has successfully received data from the device B at time T15 "Receiving succeeded (C←B)", that data communication from the device C to the device E has not been successfully performed at time T16 "Transmission failed (C→E)", and that a timeout has occurred at time T17 due to the absence of data communication from the device E to the device C "Timeout (C→E)".

Figure 8:
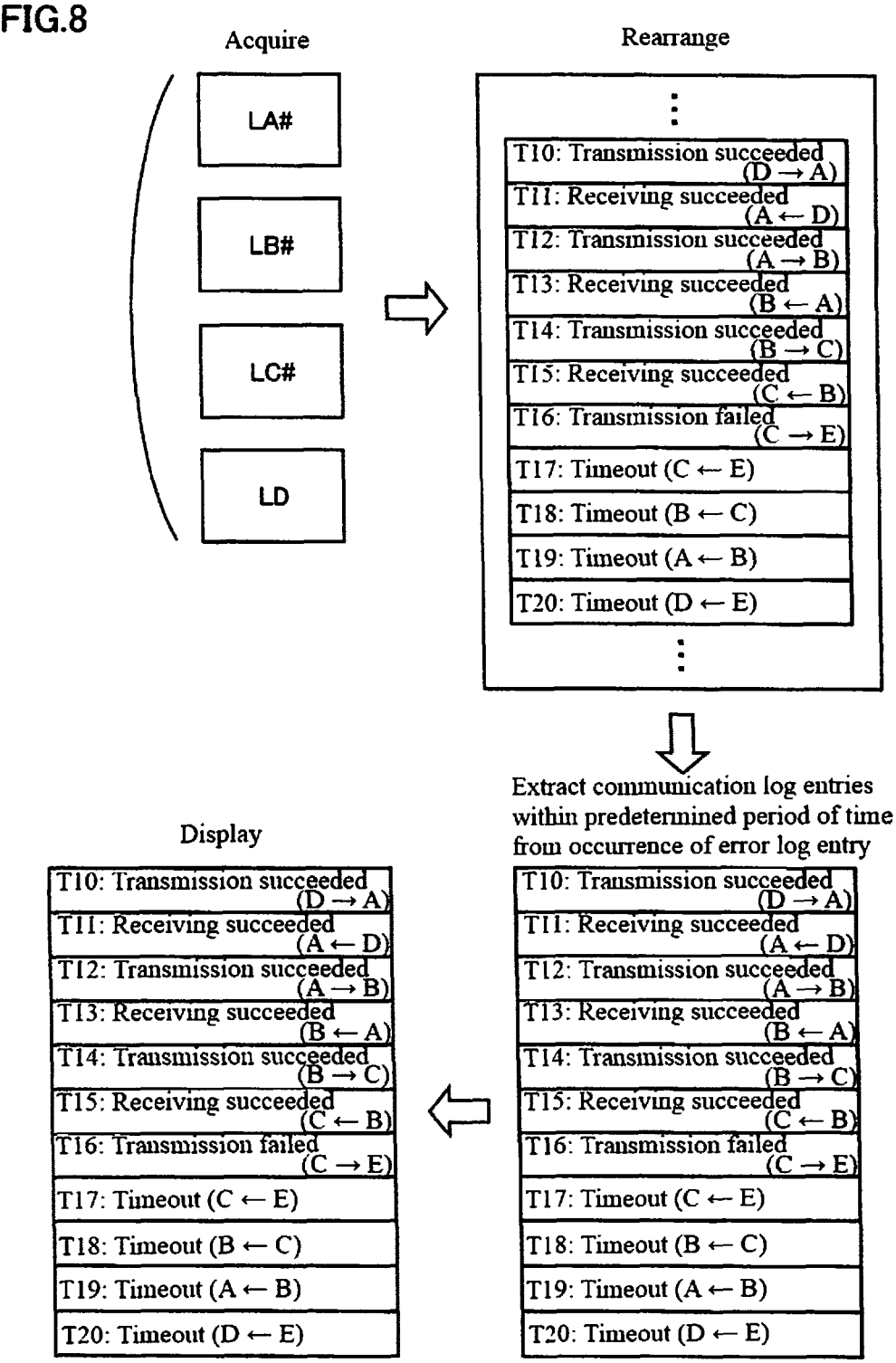
FIG. 8 is a diagram illustrating an example of communication log entries that are processed by the PC 10 of the communication system according to the modification of Embodiment 1.

FIG. 8 is a diagram illustrating an example of communication log entries that are processed by the PC 10 of the communication system according to the modification of Embodiment 1.

Referring to FIG. 8, the log entry acquiring section 102 of the PC 10 acquires communication log entries from the PLCs. Specifically, in the present example, the log entry acquiring section 102 acquires the communication logs LA#, LB#, and LC# of the master PLC 20 and the slave PLCs, respectively. Furthermore, the log entry acquiring section 102 acquires the communication log LD of the safety master 30. Note that in the present example, it is assumed that the log entry acquiring section 102 does not acquire the communication log LE from the safety slave 32 because the communication abnormality has occurred.

The log entry rearranging section 104 of the PC 10 rearranges the communication log entries contained in the communication logs LA# to LC# and LD in chronological order in accordance with the times (time information) contained in the respective communication log entries.

In the present example, a case in which the communication log entries are rearranged in chronological order from time T10 up to time T20 is shown.

Then, the log entry extracting section 106 extracts, out of the communication log entries rearranged by the log entry rearranging section 104, communication log entries that have been recorded within a predetermined period of time from the occurrence of a communication log entry including communication abnormality information that indicates the occurrence of the abnormality in communication as the communication state. Specifically, in the present example, it is assumed that "Transmission failed" or "Timeout" corresponds to a communication log entry that indicates communication abnormality information.

For example, communication log entries that have been recorded within a predetermined period of time (predetermined range) before and after a communication log entry (also referred to as "error log entry") including communication abnormality information are extracted as the communication log entries that have been recorded within a predetermined period of time from the occurrence of the communication log entry including the communication abnormality information.

The above-described processing makes it possible to collectively display a series of communication log entries including communication log entries (error log entries) and the like including communication abnormality information by extracting those communication log entries that have been recorded within a predetermined period of time before and after the communication log entry including the communication abnormality information, instead of extracting and displaying only the communication log entries that include communication abnormality information or displaying all the communication log entries. Therefore, mutually related error conditions can be easily recognized.

Note that although a case in which the safety master 30 and the safety slave 32 are respectively coupled to the slave PLCs was described in the present example, the present invention is not limited to this configuration. For example, a configuration may also be adopted in which they are coupled to the safety master 30.

Embodiment 2

In Embodiment 1 and the modification thereof, a case in which communication log entries that have been recorded within a predetermined period of time relative to a communication log entry including communication abnormality information are extracted was described, whereas in Embodiment 2, a method for further recognizing an error condition in an easy manner based on the extracted communication log entries will be described.

Figure 9:
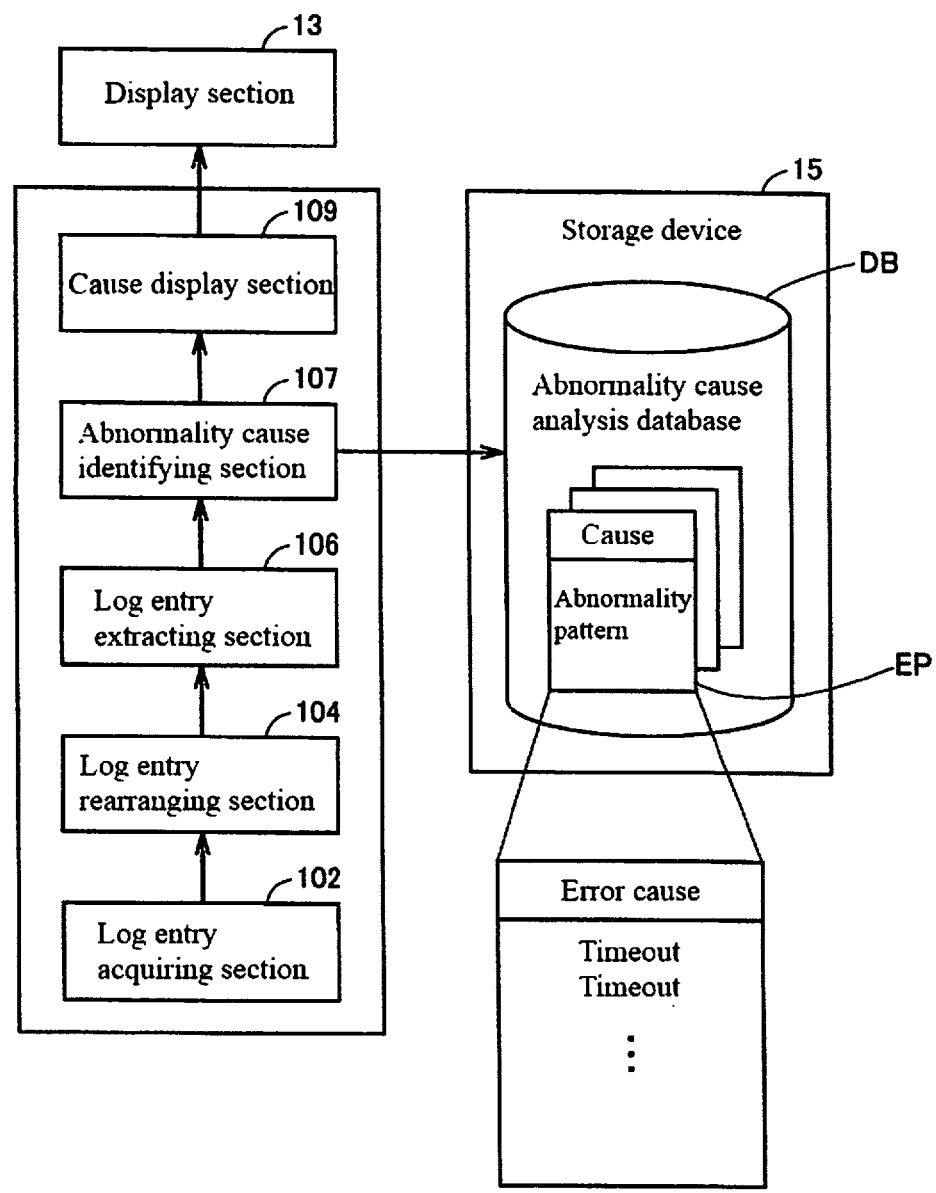
FIG. 9 is a diagram illustrating functional blocks that are executed by the CPU 11 of the PC 10 according to Embodiment 2.

FIG. 9 is a diagram illustrating functional blocks that are executed by the CPU 11 of the PC 10 according to Embodiment 2.

Referring to FIG. 9, in the present example, the PC 10 includes the log entry acquiring section 102 that acquires communication log entries from the PLCs as history information regarding the communication state, the log entry rearranging section 104 that rearranges the acquired communication log entries, the log entry extracting section 106 that extracts log entries from the rearranged communication log entries as necessary, an abnormality cause identifying section 107 that identifies the cause of an abnormality with respect to the extracted communication log entries by referring to an abnormality cause analysis database, which will be described later, and a cause display section 109 that displays the cause of the abnormality identified by the abnormality cause identifying section 107. Moreover, the storage device 15 of the present example has the abnormality cause analysis database DB (also referred to simply as "database DB") in which the causes of abnormalities and abnormality patterns associated therewith are stored, the abnormality patterns including at least one communication log entry including communication abnormality information. The database DB stores a plurality of error pattern data items DP as the abnormality patterns. In the error pattern data items DP, error causes are associated with communication log entry patterns attributed to the error causes. Here, a case in which a combination of a plurality of timeouts is associated with error causes is shown as an example.

In Embodiment 2, the abnormality cause identifying section 107 refers to the database DB in accordance with the extracted communication log entries, thereby identifying the cause of the abnormality. Specifically, based on the extracted communication log entries including the communication abnormality information, the abnormality cause identifying section 107 refers to the database DB and determines whether an error pattern data item DP corresponding to the pattern of the extracted communication log entries is present. If the error pattern data item DP is present, an error cause is identified in accordance with that error pattern data item DP. Then, the cause display section 109 displays the identified cause of the abnormality on the display section 13. Note that the number of error causes is not limited to one, and if a plurality of causes are present, the cause display section 109 displays the plurality of causes.

Note that the error pattern data items DP are created in advance by analyzing patterns of communication log entries and patterns that cause abnormalities by performing simulations, experiments, and the like. Although a case in which the error pattern data items DP are stored in the storage device 15 in advance is described in the present example, it goes without saying that the error pattern data items DP can also be downloaded from a server or the like and saved.

FIG. 10 is a diagram illustrating display of a troubleshooting log that is displayed on the display section 13 according to Embodiment 2.

Referring to FIG. 10, in the present example, a case in which the cause display section 109 displays the troubleshooting log on the display section 13 will be described.

In the present example, the communication log entries that have been recorded within a predetermined period of time from the occurrence of the communication log entry including the communication abnormality information described with reference to FIG. 8 are extracted by way of example, and thus the communication log entries from time T10 up to time T20 are extracted and displayed. Also, the causes of the abnormality that are identified based on the extraction result are shown.

Specifically, "Communication timeout has occurred during communication with safety slave." is displayed as the details of the abnormality, and, in the present example, four possible causes of the abnormality are shown as examples. Note that although four possible causes are shown as examples, the number of possible causes shown as examples may be one, or a plurality of possible causes may be displayed as examples. Moreover, the possible causes may be displayed in descending order of possibility.

Specifically, the four possible causes are as follows. (1) Abnormality in setting: the task execution timeout time with respect to the master PLC is set to an excessively small value. (2) Excessive noise has occurred. (3) A system abnormality has occurred in the master PLC. (4) Occurrence of abnormality in safety slave PLC: Some abnormality has occurred in this device, and process data communication has not been properly executed.

The display of the possible causes enables the user to easily recognize the cause of the error. Therefore, it is possible to easily recognize the cause of an error and easily locate a fault to be eliminated.

Note that the above display example is merely an example. Naturally, it is also possible to execute display processing in accordance with other error pattern data items DP based on other combinations of communication log entries and the like.

Moreover, an application that is executable on a personal computer may be provided as the program of the embodiments. At this time, the program according to the embodiments may be incorporated as part of the functions of various applications that are executed on the personal computer.

The embodiments disclosed herein should be considered as illustrative, and the present invention is not limited only to the foregoing description. The scope of the present invention is indicated by the appended claims, and all changes which come within the meaning and range of equivalency of the claims are intended to be embraced therein.

INDEX TO THE REFERENCE NUMERALS

10 . . . information processing device; 11 . . . CPU; 12 . . . input operation section; 13 . . . display section; 14 . . . RAM; 15 . . . storage device; 16, 128 . . . communication section; 17 . . . internal bus; 20, 22, 24 . . . PLC; 26 . . . network; 30 . . . safety master; 32 . . . safety slave; 102 . . . log entry acquiring section; 104 . . . log entry rearranging section; 106 . . . log entry extracting section; 107 . . . abnormality cause identifying section; 108 . . . log entry display section; 109 . . . cause display section; 122 . . . nonvolatile memory; 124 . . . control section; 126 . . . internal memory.

The invention claimed is:

1. An information processing device for collecting information on an operating state of a communication system formed of a master device for managing communication over a network and at least one slave device that is connected to the network and that is capable of performing communication processing as instructed by the master device,
wherein the master device and the slave device record communication log entries regarding time information and a communication state in accordance with the communication processing,
the information processing device comprising a processor configured with a program to perform operations comprising:
operation as an acquiring section configured to acquire ones of the communication log entries from at least one of the master device and the slave device;
operation as a log entry rearranging section configured to rearrange the acquired ones of the communication log entries based on the time information; and
operation as a log entry extracting section configured to extract, out of the acquired ones of the communication log entries rearranged by the log entry rearranging section, any communication log entry of the extracted acquired ones of the communication log entries, that is recorded within a predetermined period of time from occurrence of a communication log entry of the extracted acquired ones of the communication log entries rearranged by the log entry rearranging section, including communication abnormality information that indicates occurrence of an abnormality in the communication processing as the communication state.

2. The information processing device according to claim 1, the processor further configured with the program to perform operations comprising:
operation as a display section configured to display the extracted acquired ones of the communication log entries rearranged by the loci entry rearranging section.

3. The information processing device according to claim 1,
wherein the communication system is provided with a safety slave device that is connected to a device related to safety and a safety master device for managing the safety slave device,
the safety slave device or the safety master device is connected to at least one of the master device and the slave device,
the safety master device is configured to issue an instruction to the safety slave device via the master device,
the safety master device and the safety slave device record additional ones of the communication log entries regarding the time information and the communication state in accordance with the communication processing, and
the acquiring section further acquires the additional ones of the communication log entries from at least one of the safety master device and the safety slave device.

4. The information processing device according to claim 1, the processor further configured with the program to perform operations comprising:
operation as an abnormality cause analysis database configured to store a cause of the abnormality and an abnormality pattern associated therewith, the abnormality pattern including at least one communication log entry of the extracted acquired ones of the communication log entries, including the communication abnormality information; and
operation as an abnormality cause identifying section configured to identify the cause of the abnormality with respect to the extracted acquired ones of the communication log entries by referring to the abnormality cause analysis database.

5. A method for controlling an information processing device that collects information on an operating state of a communication system formed of a master device that manages communication over a network and at least one slave device that is connected to the network and that is capable of performing communication processing as instructed by the master device,
wherein communication log entries regarding time information and a communication state are recorded in the master device and the slave device in accordance with the communication processing,
the method comprising:
acquiring ones of the communication log entries from at least one of the master device and the slave device;
rearranging the acquired ones of the communication log entries based on the time information; and
extracting, out of the rearranged acquired ones of the communication log entries, any communication log entry of the rearranged acquired ones of the communication log entries recorded within a predetermined period of time from occurrence of a communication log entry of the rearranged acquired ones of the communication log entries, including communication abnormality information that indicates occurrence of an abnormality in the communication processing as the communication state.

6. The method according to claim 5, further comprising displaying extracted ones of the rearranged acquired ones of the communication log entries.

7. The method according to claim 5,
wherein the communication system is provided with a safety slave device that is connected to a device related to safety and a safety master device for managing the safety slave device,
the safety slave device or the safety master device is connected to at least one of the master device and the slave device,
the safety master device is configured to issue an instruction to the safety slave device via the master device, and
the safety master device and the safety slave device record additional communication log entries regarding the time information and the communication state in accordance with the communication processing;

the method further comprising acquiring the additional communication log entries from at least one of the safety master device and the safety slave device.

8. The method according to claim 5, further comprising:
storing, in an abnormality cause analysis database, a cause of the abnormality and an abnormality pattern associated therewith, the abnormality pattern including at least one communication log entry of the extracted acquired ones of the communication log entries, including communication abnormality information; and
identifying the cause of the abnormality with respect to extracted ones of the rearranged acquired ones of the communication log entries by referring to the abnormality cause analysis database.

9. A non-transitory computer-readable medium storing instructions that, when executed by a processor of an information processing device that collects information on an operating state of a communication system formed of a master device that manages communication over a network and at least one slave device that is connected to the network and that is capable of performing communication processing as instructed by the master device wherein communication log entries regarding time information and a communication state are recorded in the master device and the slave device in accordance with the communication processing, cause the processor to perform operations comprising:

acquiring ones of the communication log entries from at least one of the master device and the slave device;

rearranging the acquired ones of the communication log entries based on the time information; and extracting, out of the rearranged acquired ones of the communication log entries, any communication log entry of the rearranged acquired ones of the communication log entries recorded within a predetermined period of time from an occurrence of a communication log entry of the rearranged acquired ones of the communication log entries, including communication abnormality information that indicates an occurrence of an abnormality in communication processing as the communication state.

* * * * *